US007780318B2

(12) United States Patent
Xiao et al.

(10) Patent No.: US 7,780,318 B2
(45) Date of Patent: Aug. 24, 2010

(54) FLOOD LAMP ASSEMBLY HAVING A REINFORCED BRACKET FOR SUPPORTING A WEIGHT THEREOF

(75) Inventors: Xu-Hua Xiao, Shenzhen (CN); Yi-San Liu, Shenzhen (CN); Li He, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 418 days.

(21) Appl. No.: 12/024,968

(22) Filed: Feb. 1, 2008

(65) Prior Publication Data

US 2009/0196037 A1 Aug. 6, 2009

(51) Int. Cl.

| | |
|---|---|
| ***B60Q 1/00*** | (2006.01) |
| ***B60Q 1/06*** | (2006.01) |
| ***F21V 21/00*** | (2006.01) |
| ***F21S 4/00*** | (2006.01) |
| ***F21S 8/00*** | (2006.01) |
| ***F16M 11/00*** | (2006.01) |
| ***E04G 5/06*** | (2006.01) |

(52) U.S. Cl. .................... 362/371; 362/370; 362/249.1; 362/427; 362/432; 248/200; 248/201; 248/202.1; 248/292.14; 248/223.21

(58) Field of Classification Search ................. 362/370, 362/371, 249.1, 287, 427, 428, 432; 248/200, 248/201, 202.1, 316.8, 292.14, 223.21, 287.1
See application file for complete search history.

(56) References Cited

U.S. PATENT DOCUMENTS

| | | | | |
|---|---|---|---|---|
| 4,180,010 | A * | 12/1979 | McDermott et al. | 362/526 |
| 4,712,168 | A * | 12/1987 | Scherrer | 362/427 |
| 4,835,515 | A * | 5/1989 | McDermott et al. | 340/472 |
| 4,960,256 | A * | 10/1990 | Chihara et al. | 248/286.1 |
| 5,323,301 | A * | 6/1994 | Kaufman | 362/287 |
| 5,433,026 | A * | 7/1995 | McDermott et al. | 40/592 |
| 6,098,952 | A * | 8/2000 | Tonn | 248/688 |
| 6,848,806 | B2 * | 2/2005 | Yoshida et al. | 362/147 |
| 6,893,139 | B2 * | 5/2005 | Cercone et al. | 362/147 |

FOREIGN PATENT DOCUMENTS

CN 101070953 A 11/2007

* cited by examiner

*Primary Examiner*—Jacob Y Choi
*Assistant Examiner*—David J Makiya
(74) *Attorney, Agent, or Firm*—Jeffrey T. Knapp

(57) ABSTRACT

An LED flood lamp includes an LED lamp and a primary bracket and an accessorial bracket. The lamp includes a pair of lateral sidewalls. The primary bracket pivotally connects with the lateral sidewalls. The accessorial bracket has one end pivotally connecting with one lateral sidewall, and another end connected to the primary bracket via a fastener. Each of the primary and accessorial brackets defines an elongated slot. The fastener is slidable along the slots of the primary and accessorial brackets to vary an illumination angle of the lamp. The LED lamp has a substrate, a plurality of LED modules mounted on a top surface of the substrate and a heat sink mounted on a bottom surface of the substrate, whereby heat generated by the LED modules can be transferred to the heat sink via the substrate to be dissipated to ambient air.

9 Claims, 4 Drawing Sheets

FLOOD LAMP ASSEMBLY HAVING A REINFORCED BRACKET FOR SUPPORTING A WEIGHT THEREOF

BACKGROUND OF THE INVENTION

1. Field of the Invention

The present invention relates to a flood lamp assembly, and more particularly to an LED flood lamp assembly having a bracket with a primary bracket and an accessorial bracket, wherein the accessorial bracket connecting with the primary bracket and the LED lamp assembly to reduce pressure exerted to the primary bracket due to a weight of the LED lamp assembly.

2. Description of Related Art

In application, a variety of lamps is widely used in different applications such as indoor lamp or outdoor lamp. A flood lamp is a light that is a source of artificial illumination having a broad beam, used in photography or decorating a contour of a building. The flood lamp is fixed to ground by a bracket. The bracket is formed by stamping/bending a metallic plate. A plurality of screws extends through the bracket to be engaged in opposite sides of the lamp to secure the bracket on the lamp. Generally, if the lamp consumes more power, the lamp is heavier. A pressure generated by the lamp due to its weight is concentrated at opposite sides of the bracket where the screws are located. When the flood lamp works for a long time, the bracket is prone to deform due to the heavy weight of the lamp acting thereon, and the screws are prone to become loose from engaging with the bracket. Therefore, the lamp can no longer be firmly secured on the bracket.

What is needed, therefore, is a flood lamp assembly having a bracket, wherein the bracket can be strong enough to support the lamp for an indefinitely long period of time.

SUMMARY OF THE INVENTION

An LED flood lamp assembly comprises a bracket for supporting an LED lamp. The bracket includes a primary bracket and two accessorial brackets. The LED lamp includes a pair of lateral sidewalls. The primary bracket pivotally connects with the lateral sidewalls of the lamp. The accessorial bracket has one end pivotally connecting with a corresponding lateral sidewall of the lamp and another end connected to the primary bracket via a fastener. The primary bracket defines two elongated slots. Each of the accessorial brackets defines an elongated slot. The fasteners are slidable along the elongated slots of the primary and accessorial brackets to vary an illumination angle of the lamp. The LED lamp has a substrate, a plurality of LED modules mounted on a top surface of the substrate and a heat sink mounted on a bottom surface of the substrate whereby heat generated by the LED modules can be transferred to the heat sink via the substrate to be dissipated to surrounding air.

Other advantages and novel features will become more apparent from the following detailed description of preferred embodiments when taken in conjunction with the accompanying drawings, in which:

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE INVENTION

Figure 1:
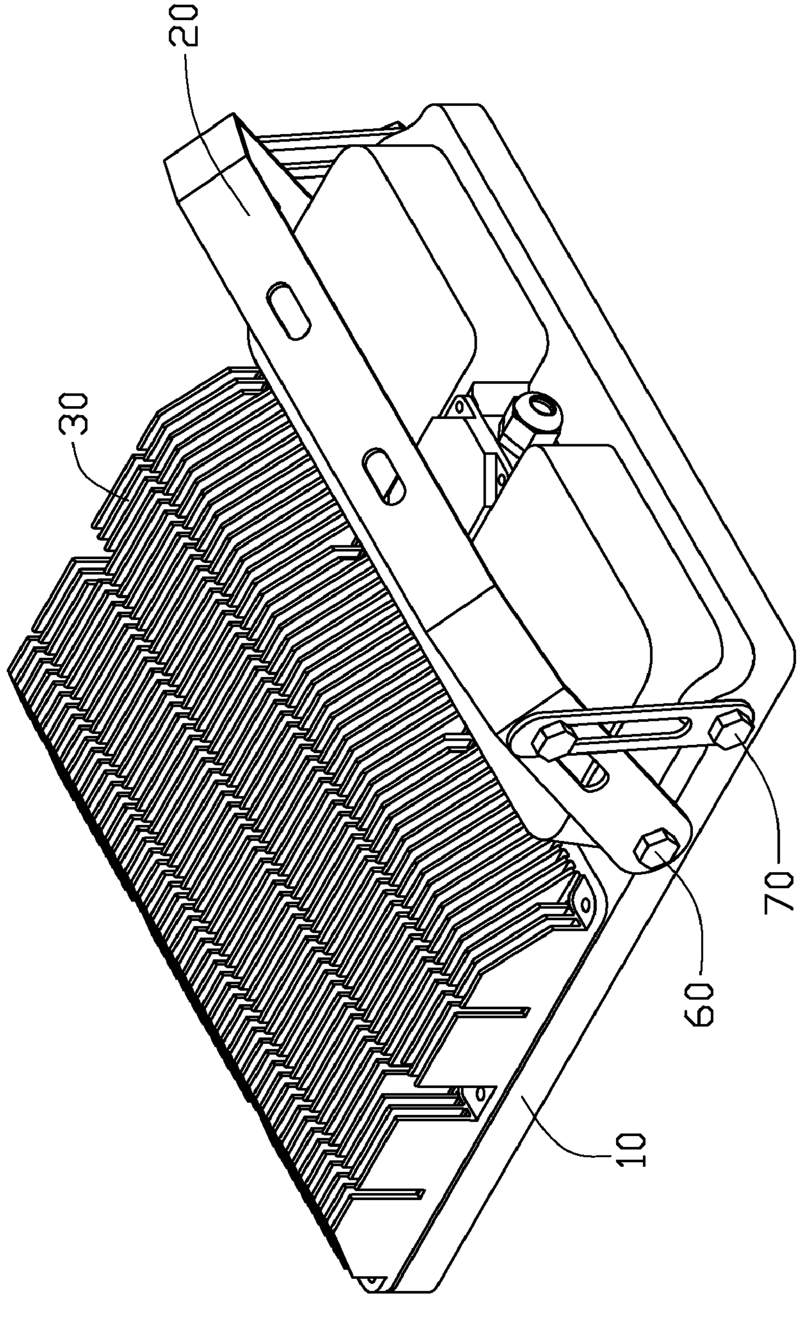
FIG. 1 is an assembled view of an LED flood lamp assembly in accordance with a preferred embodiment of the present invention.
Figure 2:
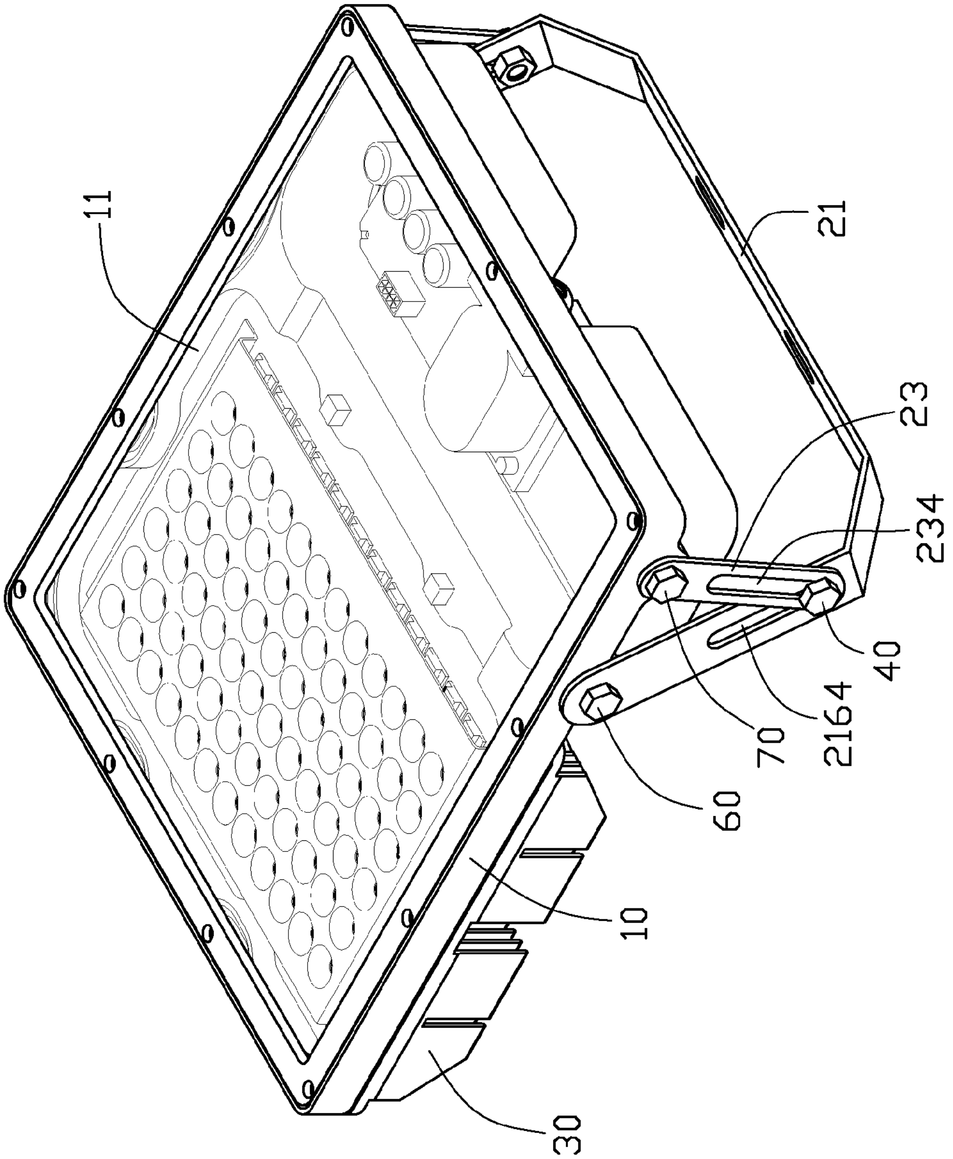
FIG. 2 is similar to FIG. 1, but viewed from a different aspect.

Referring to FIGS. 1-2, an LED flood lamp assembly in accordance with a preferred embodiment of the present invention comprises an LED lamp 10 and a bracket 20 pivotally connecting with the LED lamp 10.

Figure 3:
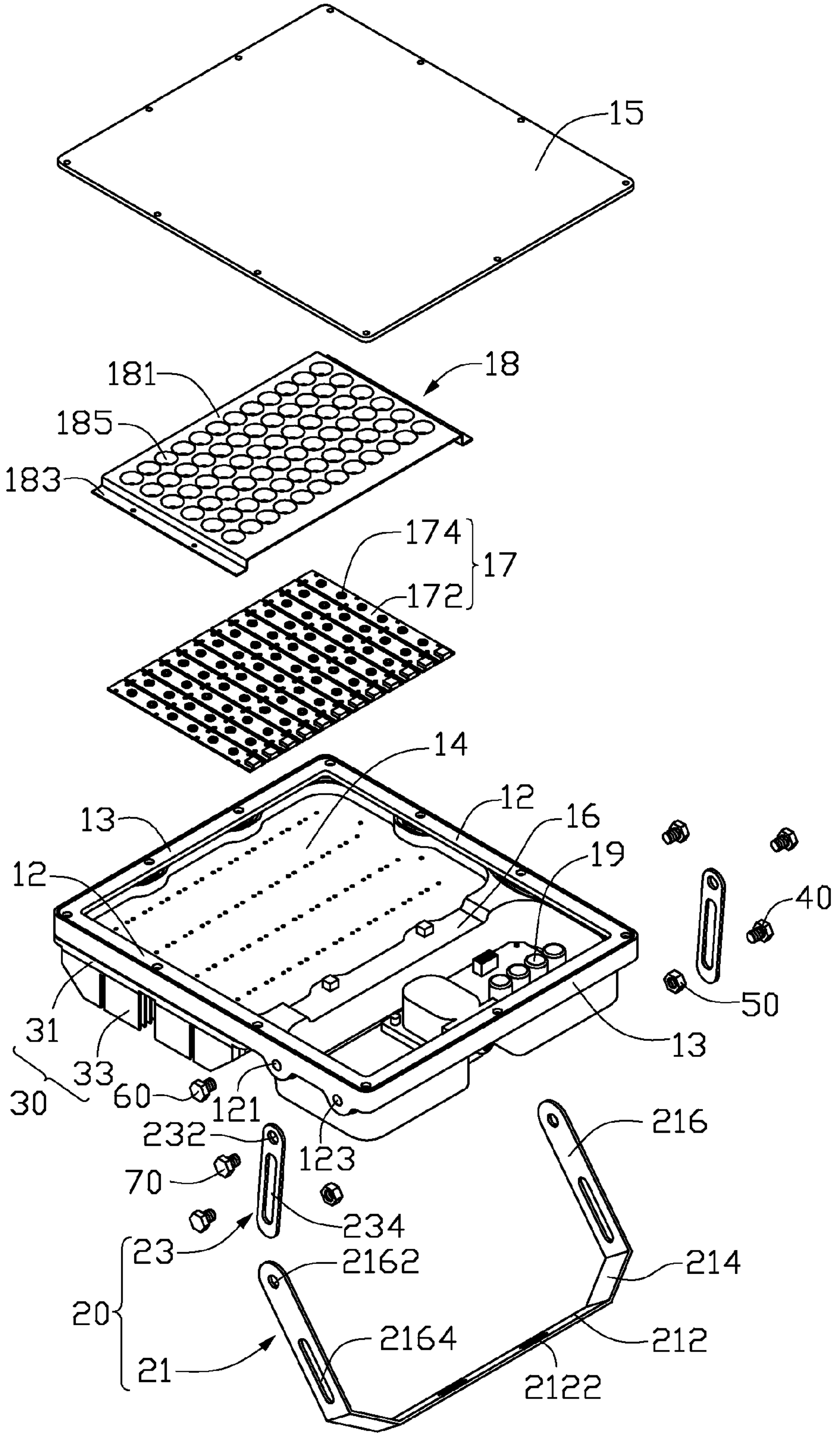
FIG. 3 is an exploded view of FIG. 2.

Referring to FIG. 3 also, the LED lamp 10 defines a rectangular and hermetical chamber 11. The chamber 11 is enclosed by a substrate 14, a flat cover 15 made of transparent glass or plastic and being parallel to the substrate 14, two pairs opposite sidewalls 12, 13 connecting the substrate 14 and the cover 15 together. The sidewalls 12, 13 and the substrate 14 are made of thermally conductive metal. Each sidewall 12 defines two spaced screw holes 121, 123 at a front end thereof. The chamber 11 is divided into a rear chamber (not labeled) and a front chamber (not labeled) by a crossbeam 16 connecting with the sidewalls 12. A plurality of LED modules 17 is mounted on a top surface (not labeled) of the substrate 14 in the rear chamber. A reflector 18 is mounted on the top surface of the substrate 14 and spans across the LED modules 17. A driving circuit module 19 is received in the front chamber and electrically connects with the LED modules 17. A heat sink 30 is mounted on a bottom surface of the substrate 14 and thermally connects therewith. The heat sink 30 is used to cool down the LED modules 17 to keep them working within an acceptable temperature range.

Each LED module 17 comprises an elongated printed circuit board 172 and a plurality of spaced LEDs 174 evenly mounted on a side of the printed circuit board 172 and toward the reflector 18. The LEDs 174 of each LED module 17 are arranged along a longitudinal direction of the printed circuit board 172. Each LED module 17 is mounted in a thermally conductive relationship with the substrate 14 of the LED lamp 10.

The reflector 18 is a metal sheet bent at two lateral ends. The reflector 18 comprises an elongated reflecting plate 181 and two mounting plates 183 extending downwardly and outwardly from lateral edges of the reflecting plate 181. The mounting plates 183 are secured on opposite edges of the substrate 14. The reflecting plate 181 is located at a top of the LED modules 17. A plurality of holes 185 is defined in the reflecting plate 181. The LEDs 174 are received in the holes 185, respectively, whereby light generated by the LEDs 174 is reflected by the reflecting plate 181 to radiate through the cover 15. By the reflecting plate 181, the light can be more intensively transmitted forwardly through the cover 15.

Figure 4:
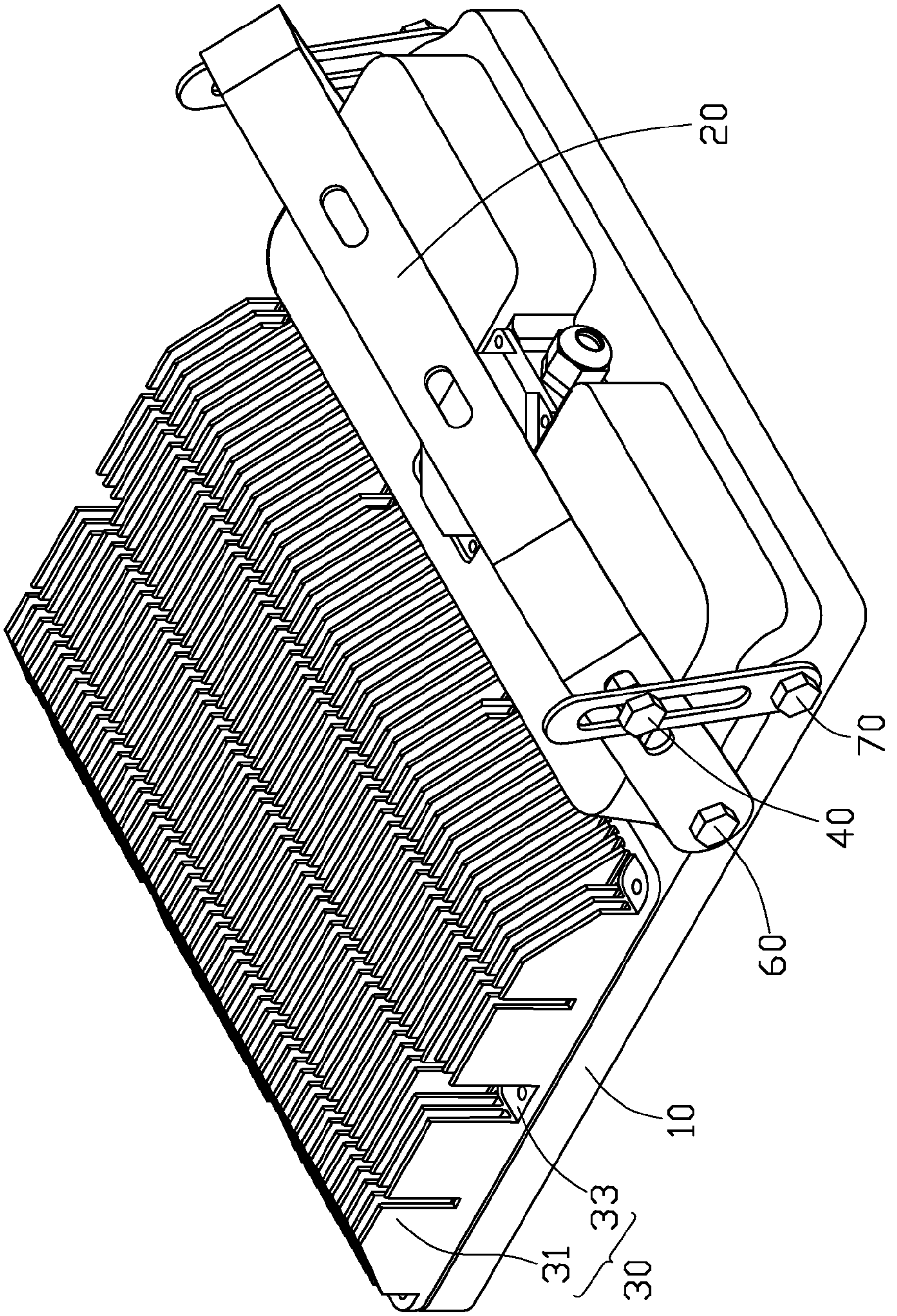
FIG. 4 is similar to FIG. 1, but a bracket of the LED flood lamp assembly is located at a different position.

Referring to FIG. 4 also, the heat sink 30 comprises a base 33 and a plurality of fins 31 perpendicularly extending outwardly from a bottom surface of the base 33. The fins 31 are parallel to and spaced from each other. The fins 31 are arranged in multiple rows and columns. A plurality of screw holes (not labeled) is defined at edges of the base 33. A plurality of screws extends through the screw holes to be engaged in the substrate 14 of the LED lamp 10 to secure the heat sink 30 on the bottom surface of the substrate 14. The heat sink 30 thermally contacts with the substrate 14, whereby heat generated by the LED modules 17 is transmitted to the heat sink 30 via the substrate 14 to be dissipated to ambient air.

The bracket 20 comprises a primary bracket 21 and a pair of accessorial brackets 23 connecting with the primary bracket 21. The primary bracket 21 is a substantially U-shaped metallic flat sheet and comprises an elongated mounting portion 212, two connecting portions 214 extending slantwise and upwardly from opposite free ends of the mounting portion 212 and two parallel adjusting portions 216 extending upwardly from free ends of the connecting portions 214. The mounting portion 212 defines two spaced through holes 2122 therein. Each adjusting portion 216 has a screw hole 2162 defined at an upper end thereof, corresponding to the screw hole 121 of the LED lamp 10, and an elongated slot 2164 defined at a lower portion thereof. A distance between the adjusting portions 216 is substantially equal to that of the sidewalls 12 in a manner such that the adjusting portions 126 can be precisely mounted to the sidewalls 12 of the LED lamp 10. Each accessorial bracket 23 is an elongated flat sheet and has a screw hole 232 defined at an upper end thereof corresponding to the screw hole 123 of the LED lamp 10, and an elongated slot 234 defined at a lower portion thereof.

In assembly, the primary bracket 21 and the accessorial brackets 23 are mounted to the sidewalls 12 of the LED lamp 10 by bring screws 60, 70 to extend through the screw holes 2162, 232 of the adjusting portions 216 of the primary bracket 21 and the accessorial brackets 23 and screw into the screw holes 121, 123 of the sidewalls 12. A fastener 40 extends through the slot 2164 of each adjusting portion 216 of the primary bracket 21 and the slot 234 of each accessorial bracket 23 and engages with a nut 50 to assemble the adjusting portion 216 of the primary bracket 21 and the corresponding accessorial bracket 23 together. The accessorial brackets 23, the adjusting portions 216 of the primary bracket 21 and the sidewalls 12 are connected together to form two triangular configurations to enhance a stability of the bracket 20 when the LED lamp assembly is mounted on a ground to have the cover 15 and the LED modules 17 face slantwise upwardly. Two screws (not shown) can be used to extend through the through holes 2122 of the mounting portion 212 of the primary bracket 21 to be engaged with a mounting member (not shown) secured to the ground to fixedly mount the LED lamp 10 on the ground. The fastener 40 comprises a head (not labeled) and an elongated shaft (not labeled) perpendicularly inserted in the slots 2164, 234 and slidable along the slots 2164, 234 An outer diameter of the heat of the fastener 40 is bigger than that of the shaft of the fastener 40. A width of the slots 2164, 234 nearly equals to the outer diameter of the shaft of the fastener 40. The fastener 40 terminates with a screwed end (not shown) to threadedly engage with the nut 50.

Referring to FIGS. 2-3, in an initial position, each fastener 40 is located at an outmost end of the slot 2162 of the primary bracket 21 and the slot 234 of the accessorial bracket 23; the nut 50 loosely engages with the screwed end of the fastener 40 in a manner such that the shaft of the fastener 40 can slide along the slot 2162 and the slot 234; the screws 60, 70 loosely engage with the LED lamp 10 in a manner such that the LED lamp 10 can be adjusted relative to the bracket 20 to change an illumination angel of the LED lamp 10. Referring to FIG. 4, when the illumination angle is determined, the nut 50 firmly engages with the fastener 40 to prevent the primary bracket 21 from moving respective relative to the accessorial bracket 23; the screws 60, 70 firmly engage with the LED lamp 10. Thus, the LED lamp 10 and the bracket 20 are assembled together. In this state, pressure generated by the LED lamp 10 due to its weight is endured by the primary and accessorial brackets 21, 23. Thus, the pressure exerted to the primary bracket 23 is reduced, whereby the bracket 20 can support the LED flood lamp assembly for an indefinitely long period of time.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An LED flood lamp assembly comprising:

a lamp having a hermetical chamber and a sidewall surrounding the chamber;

a substrate received in the chamber;

a plurality of LED modules attached to a top surface of the substrate;

a heat sink attached to a bottom surface of the substrate whereby heat generated by the LED modules is transferred to the heat sink via the substrate to be dissipated to ambient air; and a bracket comprising:

a primary bracket pivotally connecting with the sidewall of the lamp; and a pair of accessorial brackets each having an end pivotally connecting with the sidewall of the lamp and another end connected to the primary bracket via a fastener, the primary defining two elongated slots and each of the accessorial brackets defining an elongated slot, the fasteners being slidable along the slots;

wherein the lamp rotates between a first position and a second position relative to the bracket by adjusting a position of the fasteners in the slots of the primary and accessorial brackets to vary an illumination angle of the LED modules of the lamp.

2. The LED flood lamp assembly as claimed in claim 1, wherein the primary bracket and the accessorial brackets are movable relative to each other when the lamp rotates.

3. The LED flood lamp assembly as claimed in claim 2, wherein the primary bracket comprises a mounting portion, two connecting portions extending from opposite ends of the mounting portion and two adjusting portions extending from the connecting portions, and each of the adjusting portions has an upper end pivotally engaging with the sidewall of the lamp, and a lower portion defining one of the two slots of the primary bracket therein and connecting with a corresponding accessorial bracket.

4. The bracket as claimed in claim 3, wherein the accessorial bracket and the corresponding adjusting portion of the primary bracket are adapted for connecting with the one of the lateral sidewalls of the lamp to form a triangular configuration to enhance a stability of the bracket.

5. The LED flood lamp assembly as claimed in claim 3, wherein the each of the accessorial brackets comprises an upper end pivotally engaging with the sidewall of the lamp, and a lower portion defining the slot of the each accessorial bracket therein and connecting with the lower portion of the each of the adjusting portions of the primary bracket.

6. The bracket as claimed in claim 5, wherein the slot of the primary bracket is defined in the lower portion of the corresponding adjusting portion of the primary bracket, and the slot of the accessorial bracket is defined in the lower portion of the accessorial bracket, the fastener extending through the slots of the primary and accessorial brackets to assemble the primary and accessorial brackets together.

7. The LED flood lamp assembly as claimed in claim 1 further comprising a reflector received in the chamber of the lamp, and the reflector reflects light emitted by the LED modules to an outside of the lamp.

8. The LED flood lamp as claimed in claim 1 further comprising a transparent cover mounted to the lamp at a location opposite the heat sink and covering the LED modules.

9. An LED flood lamp comprising: a rectangular housing having two opposite lateral sidewalls; a substrate received in the housing, a heat sink thermally connecting with a bottom surface of the substrate, an LED module attached to a top surface of the substrate whereby heat generated by the LED module is transferred to the heat sink via the substrate to be dissipated to ambient air; a bracket unit attached to the housing for supporting the LED flood lamp on a supporting member, comprising: a primary bracket having a U-shaped configuration with two arms pivotably connected to the two opposite lateral sidewalls of the housing and a pair of accessorial brackets each having an end pivotably connecting with one of the two opposite lateral sidewalls of the housing and another end connecting with one of the two arms of the primary bracket, whereby a position of another end of the each accessorial bracket relative to the primary bracket is variable; each the arms of the primary bracket defines an elongated slot therein, and each of the accessorial brackets has an elongated slot defined therein, a fastener extending through the two elongated slots to connect the each of the arms and the each of the accessorial brackets together; and wherein the lamp rotates between a first position and a second position relative to the bracket by adjusting a position of the fasteners in the slots of the primary and accessorial brackets to vary an illumination angle of the LED module of the lamp.

* * * * *